(12) United States Patent
Abeles

(10) Patent No.: US 12,349,618 B2
(45) Date of Patent: Jul. 8, 2025

(54) APPARATUS AND METHOD OF CREATING WETLANDS IN HOT ARID ENVIRONMENTS

(71) Applicant: VIRIDIS ARBOR LLC, Verona, NJ (US)

(72) Inventor: Gary E. Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 0 days.

(21) Appl. No.: 19/065,443

(22) Filed: Feb. 27, 2025

(65) Prior Publication Data

US 2025/0194457 A1   Jun. 19, 2025

Related U.S. Application Data

(63) Continuation-in-part of application No. 19/003,522, filed on Dec. 27, 2024, which is a
(Continued)

(51) Int. Cl.
*A01C 14/00* (2006.01)
*A01C 1/04* (2006.01)
(Continued)

(52) U.S. Cl.
CPC .............. *A01C 14/00* (2013.01); *A01C 1/044* (2013.01); *A01G 13/21* (2025.01); *A01G 20/20* (2018.02);
(Continued)

(58) Field of Classification Search
CPC ........ A01G 20/20; A01G 13/30; A01G 13/32; A01C 14/00
See application file for complete search history.

(56) References Cited

U.S. PATENT DOCUMENTS 3,698,131 A * 10/1972 Kesinger ................ A01G 9/242
47/29.1
3,733,745 A * 5/1973 Ingerstedt .............. A01G 9/029
47/77
(Continued)

FOREIGN PATENT DOCUMENTS

DE        2709562 A1 *  9/1977  ......... A01G 13/0231
EP        3570653 B1 * 12/2020  ............... A01C 1/02
(Continued)

*Primary Examiner* — Monica L Perry
(74) *Attorney, Agent, or Firm* — Maine Cernota & Curran

(57) ABSTRACT

A method of creating a wetland in a hot, arid, location includes identifying or establishing a channel of flowing water at the arid location, and installing therein a mat containing seeds, and/or seedlings, and a super absorbent polymer (SAP). Water from the channel is applied to hydrate the SAP, and both edible and dam-constructing vegetation is allowed to grow and mature from the seeds and/or seedlings. Beavers are then introduced into the arid location, which eat the edible vegetation and use the dam-constructing vegetation to construct at least one dam across the channel of flowing water, thereby forming a wetland that further encourages both the vegetation and the beavers to propagate. A perforated, transparent or translucent cover sheet can be placed on or suspended above the mat. A water barrier can be placed below the mat. The wetland vegetation cools and humidifies the environment by transpiration of water.

16 Claims, 9 Drawing Sheets

Related U.S. Application Data continuation-in-part of application No. 17/667,306, filed on Feb. 8, 2022, now Pat. No. 12,213,397, which is a continuation-in-part of application No. 16/853,981, filed on Apr. 21, 2020, now Pat. No. 11,277,962, which is a continuation of application No. 15/476,017, filed on Mar. 31, 2017, now Pat. No. 10,660,264, which is a continuation-in-part of application No. 14/203,872, filed on Mar. 11, 2014, now Pat. No. 9,629,341.

(60) Provisional application No. 61/786,721, filed on Mar. 15, 2013.

(51) Int. Cl.
    *A01G 13/21*     (2025.01)
    *A01G 20/20*     (2018.01)
    *A01C 21/00*     (2006.01)
    *A01G 24/35*     (2018.01)

(52) U.S. Cl.
    CPC .............. *A01C 21/00* (2013.01); *A01G 24/35* (2018.02); *Y02A 40/28* (2018.01)

(56) References Cited

U.S. PATENT DOCUMENTS

| | | | | |
|---|---|---|---|---|
| 3,962,823 A * | 6/1976 | Zipperer, III | .......... | A01G 24/50 383/105 |
| 4,285,162 A * | 8/1981 | Hilton | ................. | A01G 9/1438 47/29.1 |
| 4,318,248 A * | 3/1982 | Muldner | ................ | A01G 20/20 47/56 |
| 4,798,023 A * | 1/1989 | Morssinkhof | .......... | A01G 13/24 47/29.1 |
| 5,423,148 A * | 6/1995 | Thornhill | ................. | A01G 9/12 47/29.1 |
| 5,598,661 A * | 2/1997 | Eiderman | .............. | A01G 9/247 203/DIG. 1 |
| 5,887,382 A * | 3/1999 | Marshall | ................ | A01C 1/044 47/74 |
| 5,911,632 A * | 6/1999 | Ko | ........................... | A01C 7/00 111/199 |
| 8,256,160 B2 * | 9/2012 | Rubin | ...................... | B01J 20/16 47/58.1 SC |
| 10,687,474 B2 * | 6/2020 | Abeles | ...................... | B01D 3/02 |
| 2002/0134010 A1 * | 9/2002 | Rohrborn, Jr. | ......... | A01G 13/26 47/29.1 |
| 2007/0163172 A1 * | 7/2007 | Savich | .................... | A01C 1/044 47/56 |
| 2007/0193116 A1 * | 8/2007 | Luckett | ................... | A01G 20/20 47/65.9 |
| 2009/0205248 A1 * | 8/2009 | Phelps | .................... | A01G 13/24 47/29.1 |
| 2009/0293350 A1 * | 12/2009 | Kania | ..................... | A01G 13/10 47/20.1 |
| 2010/0050509 A1 * | 3/2010 | Luckett | ................... | A01G 20/20 47/65.9 |
| 2010/0236142 A1 * | 9/2010 | Drewry | ................... | A01G 13/20 47/29.1 |
| 2013/0192131 A1 * | 8/2013 | Abahusayn | ............. | A01G 9/14 47/17 |
| 2015/0201565 A1 * | 7/2015 | Toye | ....................... | A01G 13/21 47/29.1 |

FOREIGN PATENT DOCUMENTS

| | | | | |
|---|---|---|---|---|
| FR | 3013943 A1 * | 6/2015 | ......... | A01G 13/0231 |
| FR | 3077464 A1 * | 8/2019 | ............. | A01G 13/02 |

\* cited by examiner

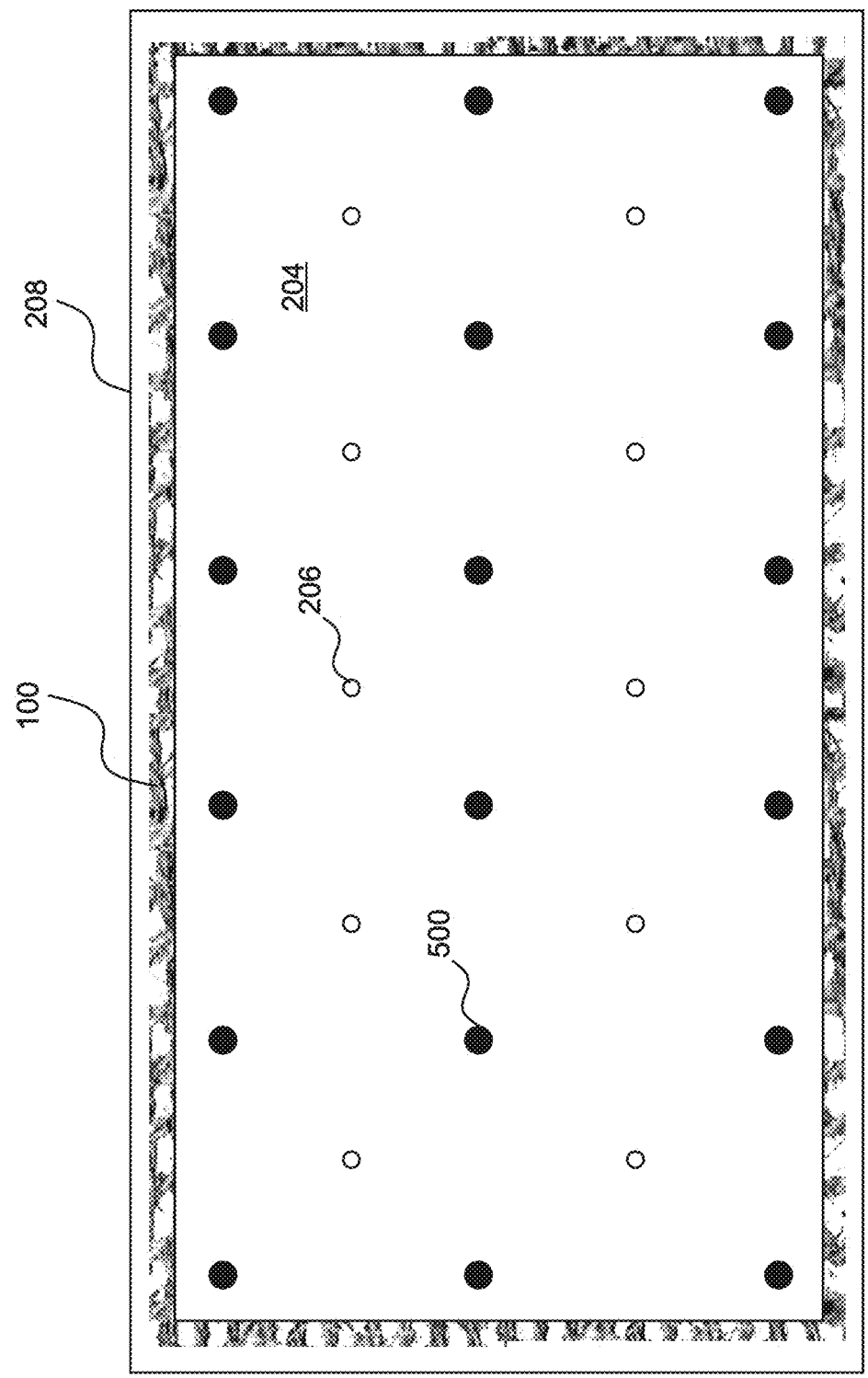

APPARATUS AND METHOD OF CREATING WETLANDS IN HOT ARID ENVIRONMENTS

RELATED APPLICATIONS

This application is a continuation in part of U.S. application Ser. No. 19/003,522. filed on Dec. 27, 2024. Application Ser. No. 19/003,522 is a continuation in part of U.S. application Ser. No. 17/667,306, filed on Feb. 8, 2022, now U.S. Pat. No. 12,213,397. Application Ser. No. 17/667,306 is a continuation in part of U.S. application Ser. No. 16/853,981, filed on Apr. 21, 2020, now U.S. Pat. No. 11,277,962. Application Ser. No. 16/853,981 is a continuation of U.S. application Ser. No. 15/476,017, filed Mar. 31, 2017, now U.S. Pat. No. 10,660,264. Application Ser. No. 15/476,017 is a continuation in part of U.S. application Ser. No. 14/203,872, filed Mar. 11, 2014, now U.S. Pat. No. 9,629,341. Application Ser. No. 14/203,872 claims the benefit of U.S. provisional application 61/786,721, filed Mar. 15, 2013. All of these applications are herein incorporated by reference in their entirety for all purposes.

FIELD OF THE INVENTION

The invention relates to apparatus and methods for creating wetlands, and more specifically to apparatus and methods for creating wetlands in hot, arid environments that lack vegetation.

BACKGROUND OF THE INVENTION

Minimal rainfall, together with high average temperatures and low humidity, are the main features that define an arid environment. When a hot, arid location is devoid of mature vegetation, the scarcity of water is typically multiplied, because high temperatures and the prevalence of unshaded sunshine can tend to quickly evaporate any moisture that is present. In addition, the ground in a hot, arid environment is often very sandy, such that any precipitation that falls as rain or forms on the surface as dew, and is not evaporated, tends to be absorbed quickly into the sand, whereupon it settles to a depth that is beyond reach of the root systems of immature vegetation.

If significant amounts of vegetation can be established in a hot, arid region, the vegetation can play a significant autogenic role in improving the environment, by blocking direct sunlight and by capturing and retaining available moisture before it is absorbed or evaporated. Vegetation can also help to cool and humidify the air in the region by drawing in groundwater and releasing it into the atmosphere during transpiration. Furthermore, over time, decomposing vegetation can reduce the porosity of the soil and thereby further improve the retention of water near the surface. However, even newly-planted vegetation that is adapted to hot, arid environments often has a very difficult time surviving until it has matured, due to the scarcity of water, the low humidity, and the high temperatures that tend to drive away any moisture that may be present.

Water that originates in neighboring non-arid regions, such as surrounding mountains, is sometimes present in arid environments, flowing through rivers, aqueducts, and/or other natural and/or man-made channels. However, unlike rainfall, which is broadly distributed, water flowing in channels through an arid region is confined to the channels in which it flows, such that any natural growth of vegetation in such areas is typically limited to border regions abutting the channels of water, while the remainder of the region remains almost devoid of moisture and vegetation. For this reason, water flowing through channels in arid environments from surrounding regions typically does little to enable the widespread growth of vegetation.

Accordingly, it can be desirable to introduce widely distributed vegetation into a hot, arid environment, so that the region can be cooled and humidified by transpiration of the vegetation. However, most existing methods for introducing new vegetation into hot, arid ecosystems are extensions of traditional agronomic technologies developed under more hospitable climates, and require intensive tending and excessive use of irrigation to have any chance of success. Often, such an expenditure of time and resources is not practical, and serves as a barrier to the improvement of arid environments, even if water in flowing streams or other channels is available.

The Great Salt Lake region of Utah is an example of a hot, arid region that includes rivers, and yet supports little vegetation. At least four rivers flow into the Great Salt Lake, which are the Bear, Jordan, Ogden, and Weber rivers. Despite the presence of water flowing in these rivers, vegetation is sparce throughout most of the region. In recent times, more and more water from these rivers has been diverted away from the Great Salt Lake for use in agriculture, and to satisfy the requirements of residents in and near Salt Lake City. Also, the lake is surrounded by more than 100,000 acres of solar evaporation ponds that are used for extracting minerals from the lake water. Numerous types of salts, metals and other minerals are extracted from these ponds, with an estimated value of close to $300 million per year. In addition, due to climate change, the rate of water evaporation from the Great Salt Lake is accelerating.

As a result, the level of water in the Great Salt Lake is rapidly decreasing, such that the lake is predicted to run dry within the next 5-7 years, if nothing is done to prevent it. As the lakebed is exposed, it will be swept up into the air as dust particles that can be harmful to humans. According to the United States EPA, particulate matter smaller than 10 micrometers (PM10) poses the greatest threat to human health, because it can penetrate deep within the lungs, and can even enter the bloodstream. Exposure to such dust has been linked to numerous diseases, such as chronic obstructive pulmonary disease and aggravated asthma, as well as heart attacks and strokes.

In recent years, some water has been diverted from the Deer Creek reservoir to the Great Salt Lake, and proposals have been made to divert water from other remote sources to the Great Salt Lake. However, while these efforts are expected to help delay or prevent the Great Salt Lake from running dry, they will do little, if anything, to alleviate the excessive heat, low humidity, and intense sunshine that are the root causes of rapid water evaporation from the Great Salt Lake.

What is needed, therefore, is an apparatus and method for broadly distributing water from flowing channels into a hot, arid environment, thereby enabling the widespread growth of vegetation, and the consequent cooling and humidification of the environment via transpiration of the water by the vegetation.

SUMMARY OF THE INVENTION

The present invention is an apparatus and method for broadly distributing water from flowing channels into a hot, arid environment, thereby enabling the widespread growth of vegetation, and the consequent cooling and humidification of the environment via transpiration of the water by the vegetation.

According to the disclosed method, water that is already present in streams and/or aqueducts within the arid environment, and/or water that is diverted from a source outside of the arid environment, is distributed throughout a selected region of the arid environment, such that it forms a wetland in which vegetation can flourish, thereby reducing temperatures and increasing humidity due to transpiration of the vegetation.

Rather than attempting to artificially distribute the water throughout the selected region, for example by building a costly and impractical network of dams and artificial rivulets, the disclosed method makes use of the natural ability of beavers to build dams and create wetlands. As is well known, beavers will naturally build dams and create wetlands whenever they are given access to a source of water, and to vegetation that is suitable to their needs. When water is available in a selected region of an arid environment, or when it can be made available, it is only necessary to introduce beavers and sufficient vegetation into the selected region, and then to allow nature to take its course.

The disclosed method employs a "bootstrap" approach to forming a wetland in an arid environment where flowing water is present. First, an initial quantity of vegetation is established in the region that will be sufficient to enable beavers to build and prosper. Once that has been achieved, the beavers are introduced into the area. The beavers make use of the pre-established, initial quantity of vegetation to build dams, and thereby transform the flowing water into a wetland.

If flowing water is not present in the arid environment, or if it is insufficient, then water from an underground aquifer, or from surrounding non-arid regions such as nearby mountains, can be directed into one or more channels that flow through the arid region. If brackish water is available in the region, for example if the arid region is proximate the Great Salt Lake, the brackish water can be desalinated, for example using reverse osmosis, and then the resulting fresh water can be directed into one or more channels that flow through the arid region. Similarly, if water is being evaporated in solar evaporation ponds within the arid region, for the purpose of extracting salt and/or other minerals from the water, the evaporation ponds can be modified or replaced with systems that retain the water when separating the salt and/or minerals from the water, and then the retained fresh water can be directed into one or more channels that flow through the arid region.

According to the disclosed invention, the initial quantity of vegetation is introduced into the arid environment by locating a mat assembly in the region that includes a mat, which can be a biodegradable coir mat, impregnated with seeds and/or seedlings, and with a "super absorbent polymer" or "SAP," where the seeds and/or seedlings comprising seeds or seedling of vegetation that can be eaten by beavers, as well as vegetation that can be used by beavers to build dams.

In embodiments, the SAP is biodegradable, and in some of these embodiments the SAP is a cellulose-based or starch-based polymer. In some embodiments, fertilizer is included in the mat. And in various embodiments at least one of sand and soil is included in the mat. The included sand or soil in some of these embodiments has a composition that is similar to sand or soil that is indigenous to the hot, arid, region.

The mat is placed either at grade or slightly below grade, and sufficient fresh water is applied to cause the SAP to become hydrated, thereby enabling the seeds and/or seedlings to sprout and take root in the mat. In some cases, the natural precipitation may be sufficient to achieve this purpose, for example if the region experiences a "rainy" season when precipitation is briefly plentiful. In other cases, the required fresh water is diverted from the flowing water that is present in the region.

In various embodiments, once the mat is placed at the hot, arid location, it is covered by a perforated cover sheet that is transparent or semi-transparent. The cover sheet serves as a physical barrier to water vapor beneath the cover sheet that is formed by evaporating dew, and by any moisture that is evaporated from the ground or mat, so that the water vapor tends to condense on the under-side of the cover sheet, and to drip back onto the mat, where it is absorbed by the SAP.

In some of these embodiments the cover sheet is placed directly onto the mat, whereby the growing vegetation lifts the cover sheet, and in embodiments eventually breaks through the cover sheet. In other embodiments, the cover sheet is supported above the mat by a support structure, such as a plurality of stakes. The perforations can be made in locations where depressions in the cover sheet will naturally form between the stakes or other supports, so that any rain that falls onto the cover sheet will drain through the perforations, and be absorbed by the SAP in the underlying mat.

The opacity of the cover sheet can be increased by printing a pattern onto the cover sheet, adding a dye to the cover sheet material, or by any other means known in the art, so as to reduce the intensity of light reaching the mat, and thereby reduce solar heating, by emulating the shade that would be provided by mature vegetation in an established ecosystem.

Embodiments further include a water barrier placed below the mat which prevents any water that is not retained by the mat and SAP from reaching the underlying soil or sand. This feature can be especially helpful in sandy locations where any moisture that reaches the underlying sand will be quickly absorbed and lost. The water barrier can be a plastic sheet, and can be cellulosic or otherwise biodegradable.

Once the wetland has been established, the available vegetation naturally increases, and the beavers reproduce. As a result, the wetlands expand and propagate. The process continues to the extent that the available water permits. This includes ground water that is drawn to the surface by the mature vegetation, as well as the flowing water that enabled the process to begin. Indeed, as the wetlands begin to cool and humidify the region, the available water naturally becomes more plentiful, as the evaporation of the water is reduced.

The present invention is a method of creating a wetland in a hot, arid location. The method includes identifying or establishing a channel of flowing water at the arid location, and placing a mat assembly at the arid location where the mat assembly includes a mat, a super-absorbent polymer ("SAP") cooperative with the mat, and seeds and/or seedlings cooperative with the mat. The seeds and/or seedlings include seeds and/or seedlings of edible vegetation and seeds and/or seedlings of vegetation that is suitable for constructing dams.

The method further includes applying fresh water to the mat, which can include water from the flowing channel, thereby hydrating the SAP in the mat, allowing the seeds and/or seedlings to mature into the edible vegetation and the vegetation that is suitable for constructing dams, introducing beavers into the arid location, and allowing the beavers to eat the edible vegetation, and to construct at least one dam across the channel of flowing water using the vegetation that is suitable for constructing dams, thereby creating a wetland.

In embodiments, the vegetation comprises at least one of bushes and trees.

In any of the above embodiments, the mat can include coir.

In any of the above embodiments, the mat assembly can further include fertilizer cooperative with the mat.

In any of the above embodiments, the mat assembly can further include at least one of sand and soil cooperative with the mat.

In any of the above embodiments, the mat assembly can further include a perforated, transparent or translucent cover sheet covering the mat. In some of these embodiments, the cover sheet is placed directly on the mat. In other of these embodiments the cover sheet is suspended above the mat by a support structure. In some of these embodiments, the support structure includes a plurality of stakes that support the cover sheet at spaced-apart support locations below the cover sheet. And in some of these embodiments the cover sheet is perforated at locations that are spaced apart from the support locations of the stakes.

In any of the above embodiments, the mat assembly can further include a water barrier installed below the mat.

In any of the above embodiments, establishing the channel of flowing water at the arid location can include drawing water from an underground aquifer and causing it to flow into the channel of flowing water.

In any of the above embodiments, establishing the channel of flowing water at the arid location can include drawing water from a surrounding non-arid region and causing it to flow into the channel of flowing water.

In any of the above embodiments, establishing the channel of flowing water at the arid location can include desalinating brackish water and causing it to flow into the channel of flowing water.

And in any of the above embodiments, establishing the channel of flowing water at the arid location can include modifying or replacing at least one solar evaporation pond within the arid location, such that water previously lost to evaporation from the solar evaporation pond is retained and caused to flow into the channel of flowing water.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 5B is a top view of the embodiment of FIG. 5A, where the cover sheet is shown as if it were opaque for clarity of illustration;

DETAILED DESCRIPTION

The present invention is an apparatus and method for broadly distributing water from flowing channels into a hot, arid environment, thereby enabling the widespread growth of vegetation, and the consequent cooling and humidification of the environment via transpiration of the water by the vegetation.

The disclosed method employs a "bootstrap" approach to forming a wetland in an arid environment where flowing water is present.

According to the disclosed method, water is already present in channels such as streams and/or aqueducts within the arid environment, and/or water is drawn from underground aquifers, or from a source outside of the arid environment, and directed into channels provided in a selected region of the arid environment. If brackish water is available in the region, for example if the arid region is proximate the Great Salt Lake, the brackish water can be desalinated, for example using reverse osmosis, and then the resulting fresh water can be directed into one or more channels that flow through the arid region. Similarly, if water is being evaporated in solar evaporation ponds within the arid region, for the purpose of extracting salt and/or other minerals from the water, the evaporation ponds can be modified or replaced with systems that retain the water when separating the salt and/or minerals from the water, and then the retained fresh water can be directed into one or more channels that flow through the arid region.

Once flowing water has been identified and/or established in the arid region, an initial quantity of vegetation is established in the selected region that will be sufficient to provide food for the beavers, and to serve as building materials that the beavers can use to build dams. Finally, once the initial quantity of vegetation is well established, the beavers are introduced into the area. The beavers then make use of the pre-established, initial quantity of vegetation to build dams in the streams and/or aqueducts, and thereby transform the flowing water into a wetland.

Figure 1:
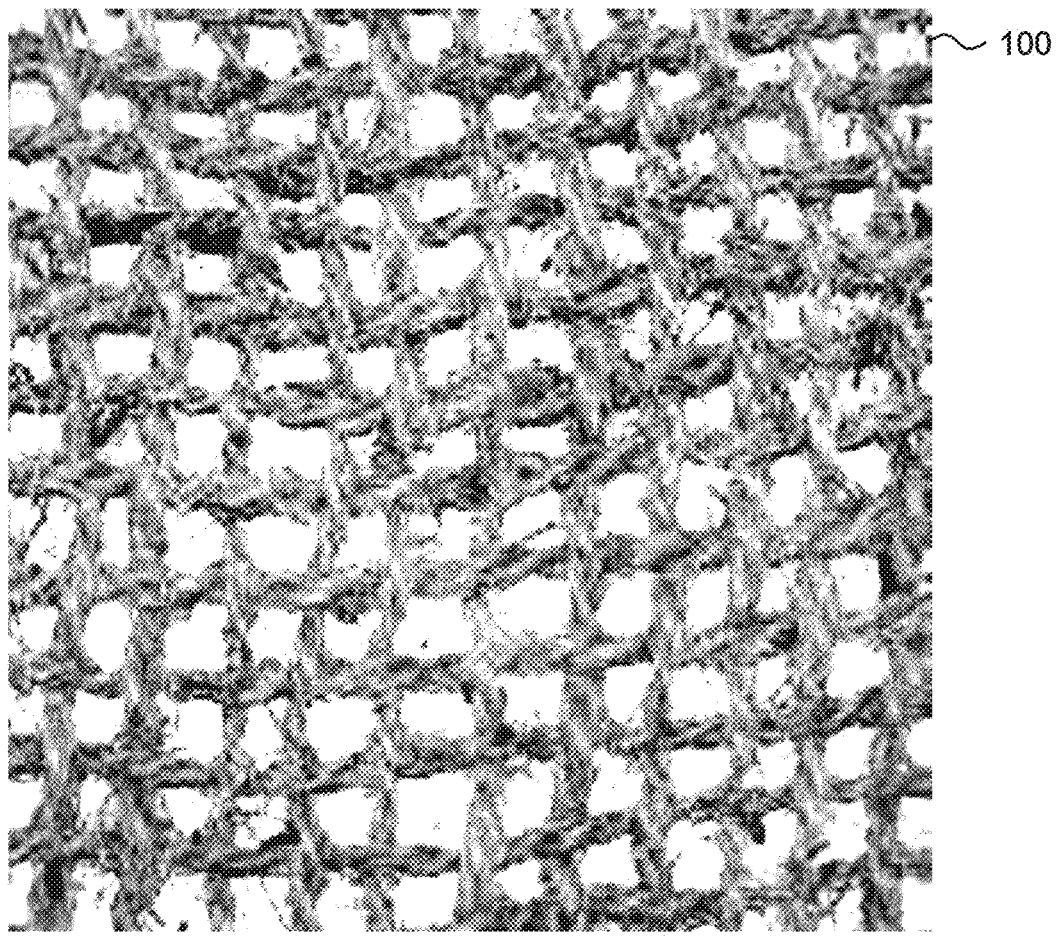
FIG. 1 is a top view of a coir fiber mat used in an embodiment of the present invention.
Figure 2:
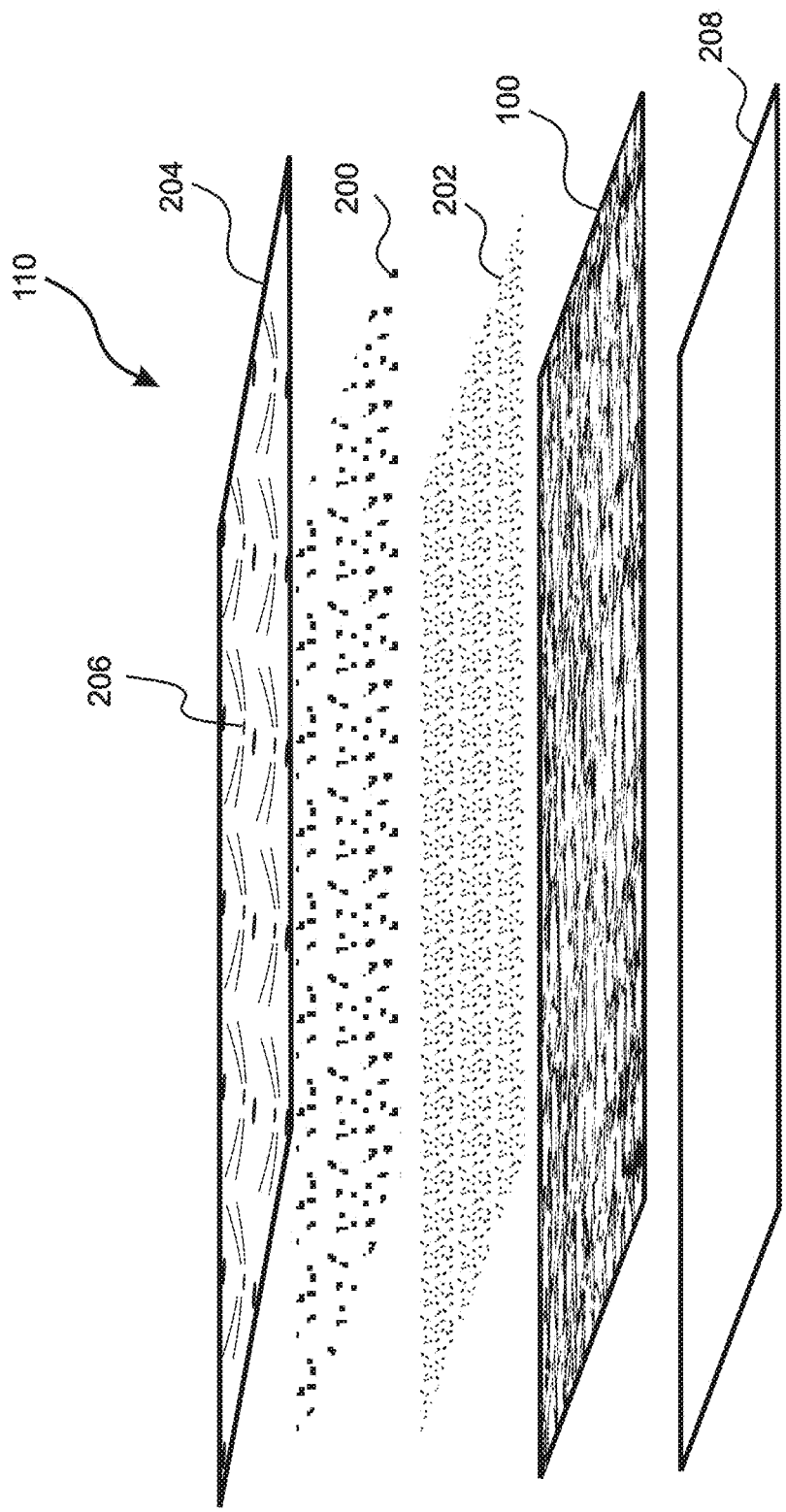
FIG. 2 is a side perspective exploded view illustrating the elements included in the mat assembly in an embodiment of the present invention.

With reference to FIGS. 1 and 2, a mat assembly 110 comprises a mat 100, which can be a biodegradable coir mat 100. With continuing reference to the exploded view of FIG. 2, the mat 100 is impregnated with seeds and/or seedlings 200 and with a "super absorbent polymer" or "SAP" 202. In embodiments, the SAP 202 is biodegradable, and in some of these embodiments the SAP 202 is a cellulose-based or starch-based polymer.

In various embodiments, the mat assembly 110 further comprises a perforated cover sheet 204 that is transparent or semi-transparent. The cover sheet 204 serves as a physical barrier to water vapor beneath the cover sheet 204 that is formed by evaporating dew, and by any moisture that is evaporated from the ground or mat 100, so that the water vapor tends to condense on the under-side of the cover sheet 204, and to drip back onto the mat 100, where it is absorbed by the SAP 202. Perforations 206 are provided in the cover sheet 204 which allow rain water to collect and penetrate through the cover sheet 204 to the mat 100. In embodiments, the perforations 206 are in locations where rain water will naturally collect.

In some embodiments, the mat assembly 110 further include a water barrier 208 placed below the mat 100, which prevents any water that is not retained by the mat 100 and SAP 202 from reaching the underlying soil or sand. This feature can be especially helpful in sandy locations where any moisture that reaches the underlying sand will be quickly absorbed and lost. The water barrier 208 can be a plastic sheet, and can be cellulosic or otherwise biodegradable.

In some embodiments, fertilizer (not shown) is included in the mat assembly 110. And in various embodiments at least one of sand and soil (not shown) is included in the mat assembly 110. The included sand or soil in some of these embodiments has a composition that is similar to sand or soil that is indigenous to the hot, arid location.

Figure 3A:
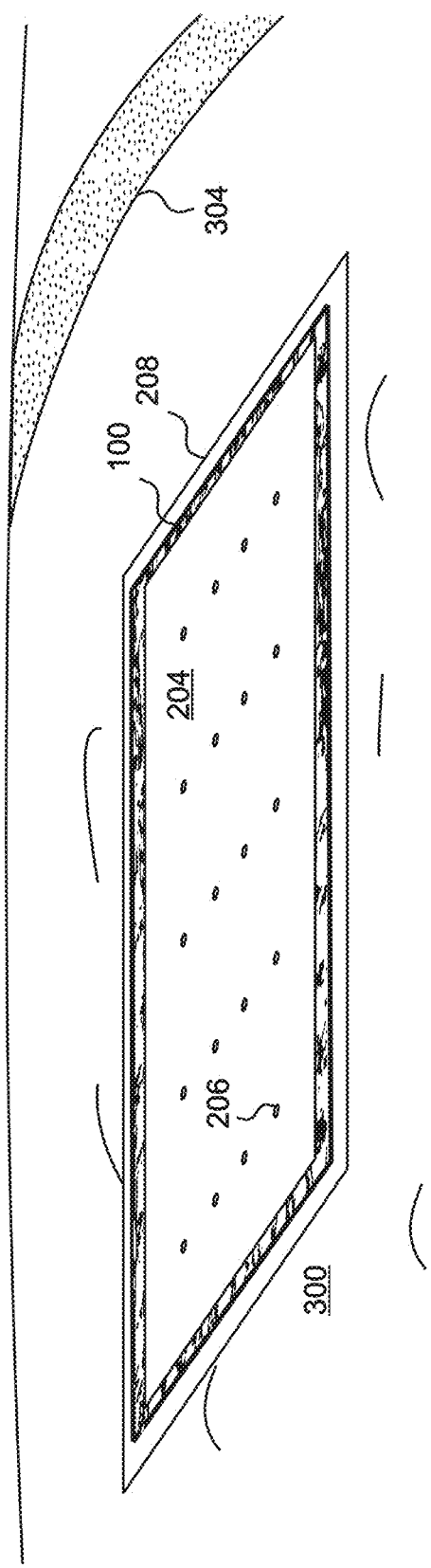
FIG. 3A is a perspective view of a mat assembly placed at a hot, arid location in an embodiment that includes a water barrier beneath the mat, and wherein the transparent cover is placed directly onto the mat.
Figure 3B:
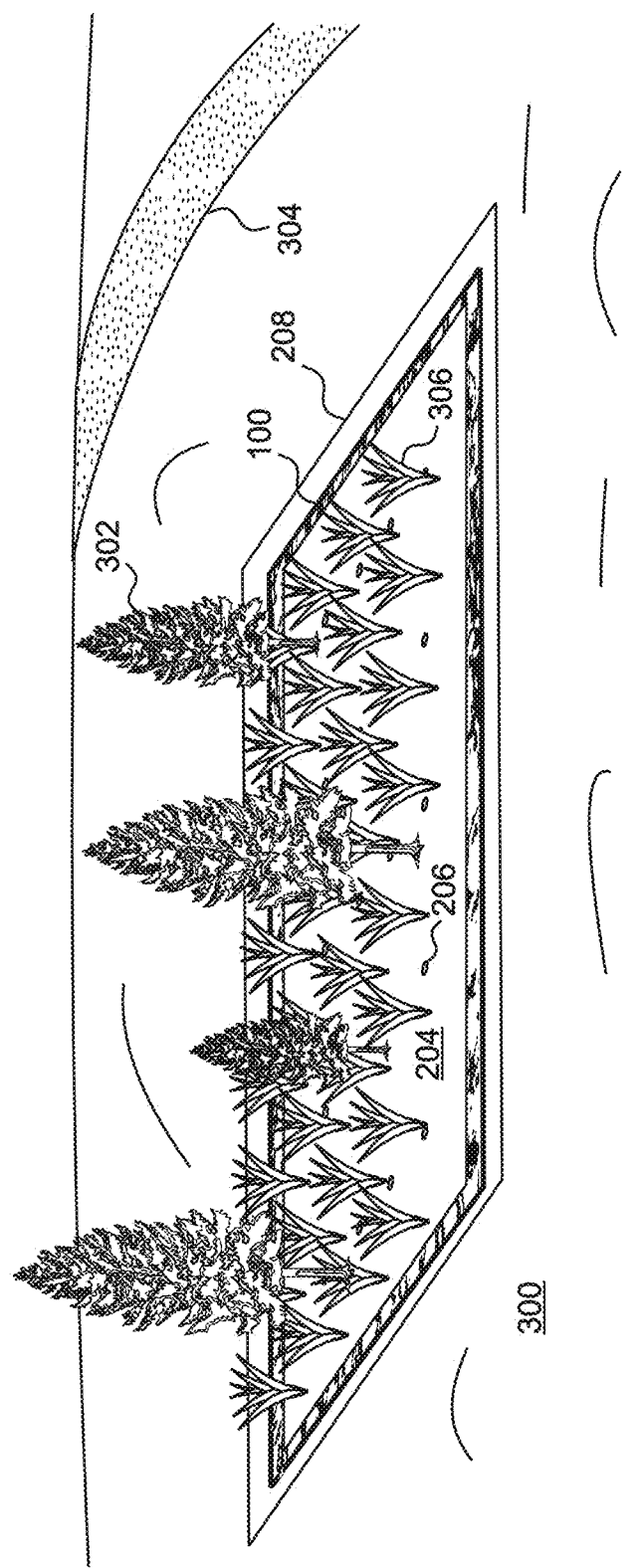
FIG. 3B is a perspective view of the mat assembly of FIG. 3A shown after the seeds and/or seedlings have sprouted and broken through the transparent cover.

With reference to FIG. 3A, in some embodiments the mat assembly 110 is placed in a selected region 300 of the hot, arid environment proximate a channel 304 through which water is flowing. The mat 100 is placed either at grade, or slightly below grade, and sufficient fresh water from the proximate channel 304 is applied to the mat 100, causing the SAP 202 in the mat 100 to become hydrated, and thereby enabling the seeds and/or seedlings 200 to sprout and/or take root in the mat 100 and burst through the cover sheet 204, as shown in FIG. 3B. The resulting vegetation includes vegetation 306 that is edible by beavers, as well as vegetation 302 that can be used by beavers to build dams. In various embodiments, the vegetation 302 that can be used to make dams includes bushes and shrubs, and/or trees.

Figure 4:
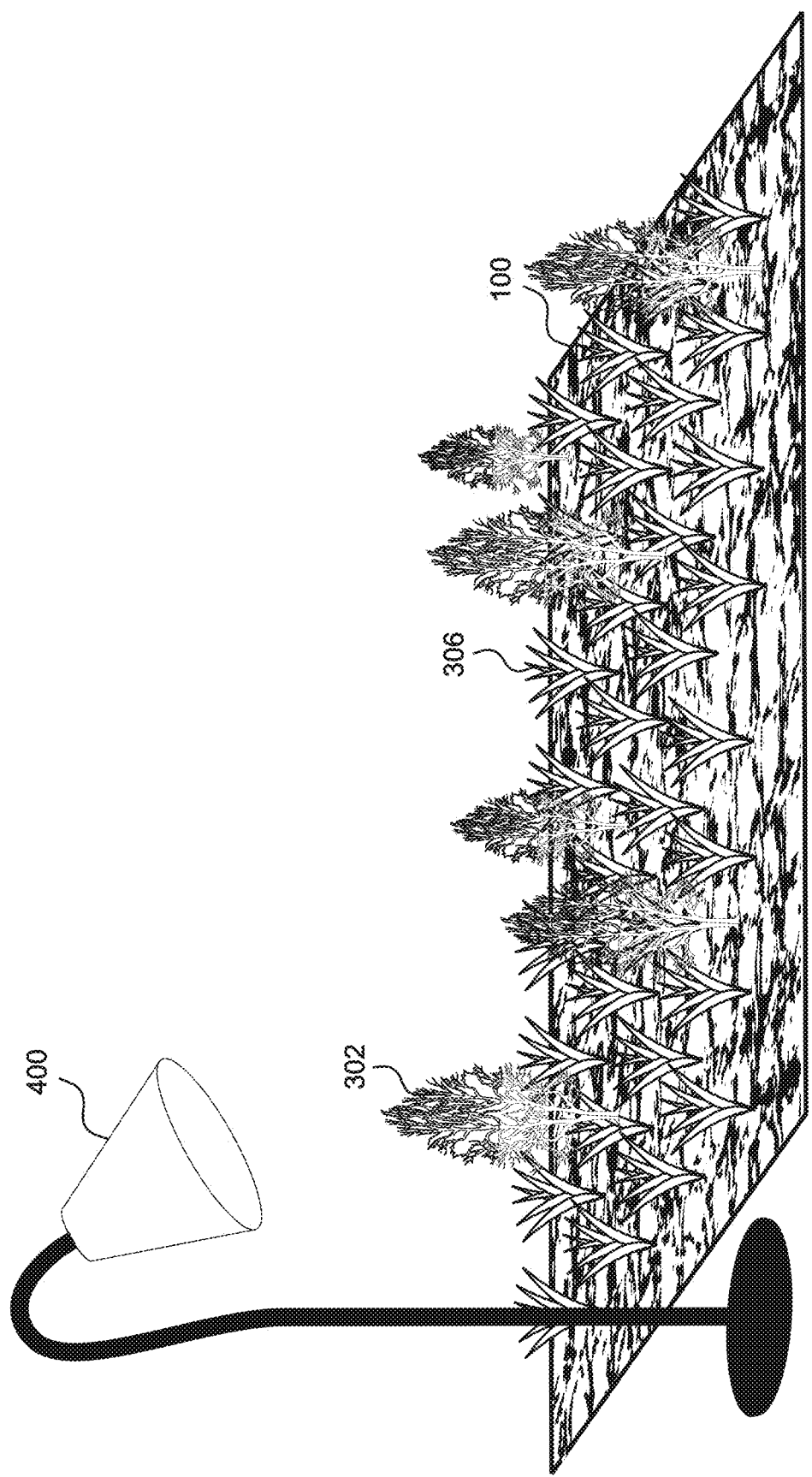
FIG. 4 is a perspective view of a mat assembly similar to FIG. 3B, in an embodiment where the vegetation is sprouted and rooted in the mat under controlled conditions before the mat is placed at the hot, arid location.
Figure 5A:
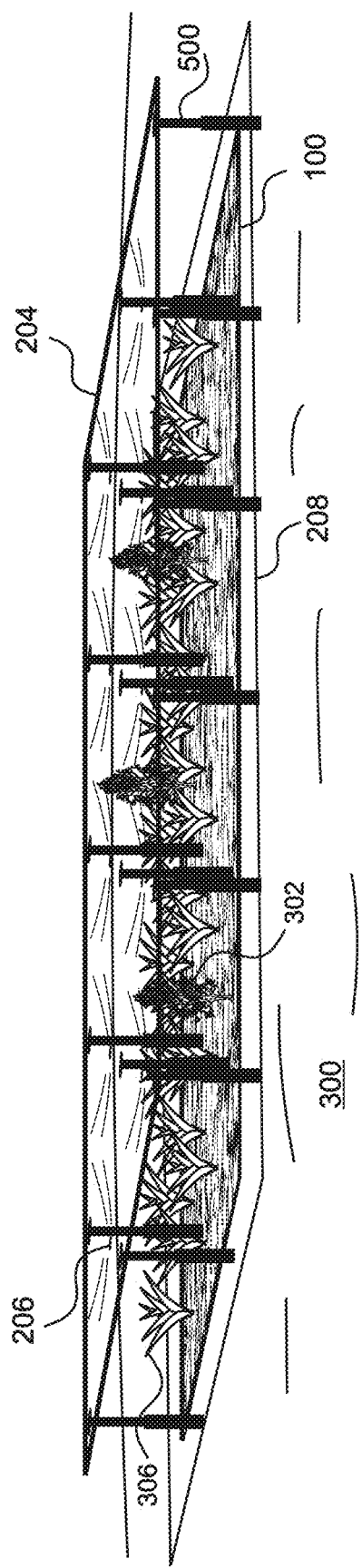
FIG. 5A is a perspective view of an embodiment of the present invention that includes a transparent perforated cover sheet suspended above the mat by stakes.

With reference to FIG. 4, in other embodiments the seeds and/or seedlings 200 are allowed to take root in the mat 100 in a climate-controlled environment, which can include artificial lighting 400, before the mat 100 is transferred to the arid region 300. With reference to FIGS. 5A and 5B, in these embodiments, the cover sheet 204 is supported above the pre-sprouted vegetation 302, 306 by stakes 500, which can be adjustable in height, for example due to a threaded, telescoping configuration. Similar embodiments use other support structures that are either fixed or adjustable in height. In the embodiment of FIGS. 5A and 5B, the cover sheet 204 is elevated by the stakes 500, such that the region below the cover sheet 204 is ventilated, thereby avoiding excess heating of the vegetation 302, 306. FIG. 5A is a perspective side view of the illustrated embodiment, while FIG. 5B is a top view of the same embodiment, in which the cover sheet 204 is rendered as if it were opaque for clarity of illustration. Similar elevated cover sheets 204 are implemented in some embodiments where the seeds 200 are caused to initially sprout after placement of the mat 100 at the arid location 300.

In some embodiments the cover sheet 204 is transparent, as shown in FIG. 5A. In similar embodiments, for example where there is excessive direct sunshine, the opacity of the cover sheet 204 is increased by printing a pattern onto the cover sheet 204, adding a dye to the sheet material of the cover sheet, or by any other means known in the art, so as to reduce the intensity of light reaching the mat 100 and vegetation 302, 306, thereby simulating the shade that would be provided by mature vegetation in an established ecosystem.

Figure 6:
FIG. 6 is a perspective view of the hot, arid location after the vegetation arising from the seeds and/or seedlings in the mat have grow and matured, and beavers have been introduced into the location.
Figure 7:
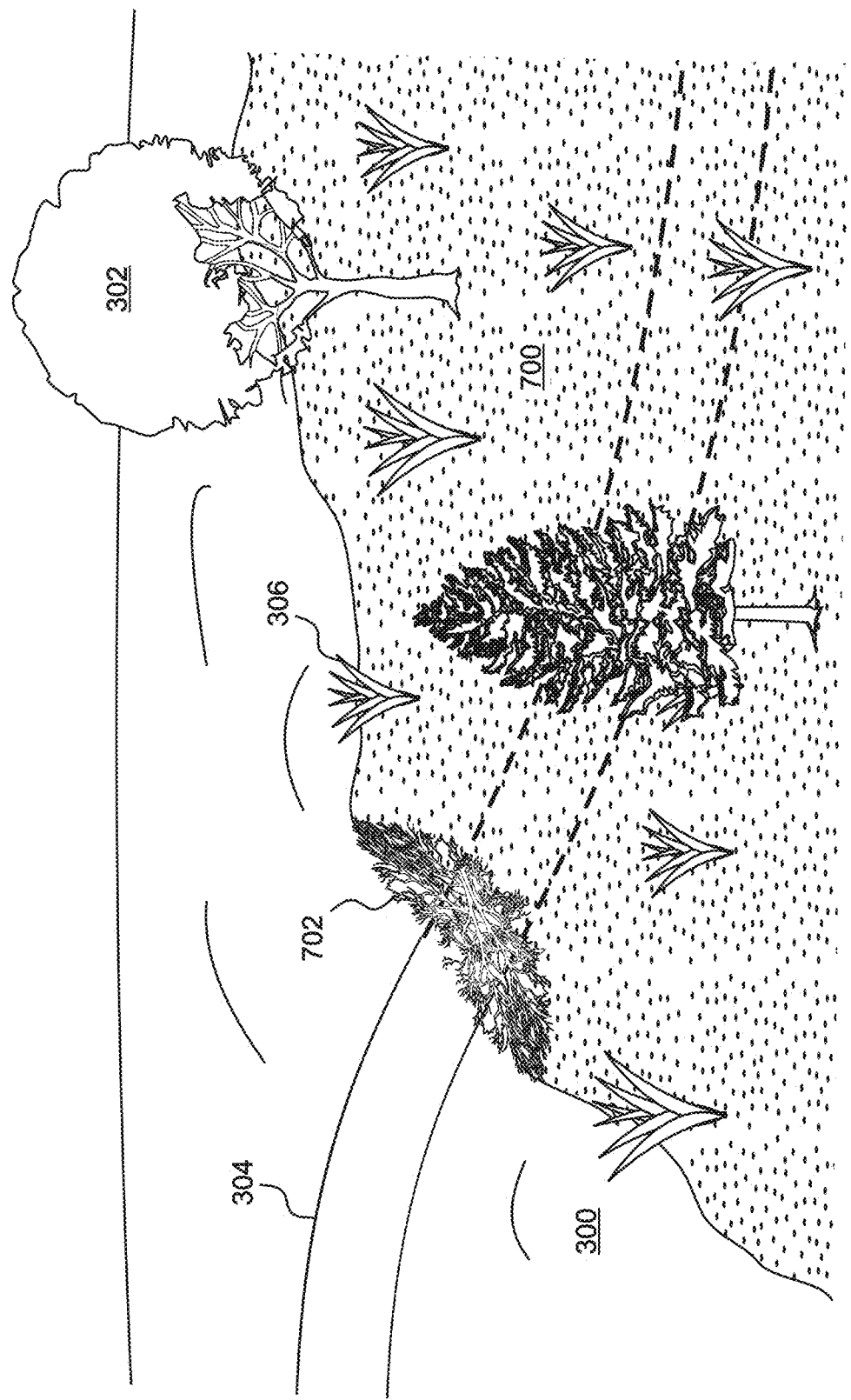
FIG. 7 is a perspective view of a wetland at the arid location created due to a dam formed in the water channel by the beavers.

With reference to FIG. 6, once an initial quantity of vegetation 302, 306 has been established in the selected region 300 of the hot, arid environment, beavers 600 are introduced into the region. With reference to FIG. 7, due to the presence of flowing water 304, and the initial quantity of vegetation 302, 306, the beavers 600 naturally commence to build dams 702 across the channels 304 of flowing water, thereby forming a wetland 700 in which vegetation 302, 306 can flourish.

Once the wetland has been established, the available vegetation 302, 306 naturally increases, and the beavers 700 reproduce. As a result, the wetlands 700 expand and propagate. The process continues to the extent that the available water permits. This includes ground water that is drawn to the surface by the mature vegetation 302, 306, as well as the flowing water 304 that enabled the process to begin. Indeed, as the wetlands 700 begin to cool and humidify the region, the available water naturally becomes more plentiful, as the evaporation of the water is reduced.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method of creating a wetland in a hot, arid location, the method comprising:
   identifying or establishing a channel of flowing water at the arid location;
   placing a mat assembly at the arid location, the mat assembly comprising:
      a mat;
      a super-absorbent polymer ("SAP") cooperative with the mat; and
      seeds and/or seedlings cooperative with the mat, the seeds and/or seedlings comprising seeds and/or seedlings of edible vegetation and seeds and/or seedlings of vegetation that is suitable for constructing dams;
   applying fresh water to the mat, thereby hydrating the SAP in the mat;
   allowing the seeds and/or seedlings to mature into the edible vegetation and the vegetation that is suitable for constructing dams;
   introducing beavers into the arid location; and allowing the beavers to eat the edible vegetation, and to construct at least one dam across the channel of flowing water using the vegetation that is suitable for constructing dams, thereby creating a wetland.

2. The method of claim 1, wherein applying the fresh water to the mat comprises applying water from the channel of flowing water to the mat.

3. The method of claim 1, wherein the vegetation comprises at least one of bushes and trees.

4. The method of claim 1, wherein the mat includes coir.

5. The method of claim 1, wherein the mat assembly further comprises fertilizer cooperative with the mat.

6. The method of claim 1, wherein the mat assembly further comprises at least one of sand and soil cooperative with the mat.

7. The method of claim 1, wherein the mat assembly further comprises a perforated, transparent or translucent cover sheet covering the mat.

8. The method of claim 7, wherein the cover sheet is applied directly to the mat, such that it rests on the mat.

9. The method of claim 7, wherein the cover sheet is suspended above the mat by a support structure.

10. The method of claim 9, wherein the support structure includes a plurality of stakes that support the cover sheet at spaced-apart support locations below the cover sheet.

11. The method of claim 10, wherein the cover sheet is perforated at locations that are spaced apart from the support locations of the stakes.

12. The method of claim 1, wherein the mat assembly further comprises a water barrier installed below the mat.

13. The method of claim 1, wherein establishing the channel of flowing water at the arid location comprises drawing water from an underground aquifer and causing it to flow into the channel of flowing water.

14. The method of claim 1, wherein establishing the channel of flowing water at the arid location comprises drawing water from a surrounding non-arid region and causing it to flow into the channel of flowing water.

15. The method of claim 1, wherein establishing the channel of flowing water at the arid location comprises desalinating brackish water and causing it to flow into the channel of flowing water.

16. The method of claim 1, wherein establishing the channel of flowing water at the arid location comprises modifying or replacing at least one solar evaporation pond within the arid location, such that water previously lost to evaporation from the solar evaporation pond is retained and caused to flow into the channel of flowing water.

* * * * *